United States Patent
Kim et al.

(10) Patent No.: US 8,296,395 B2
(45) Date of Patent: Oct. 23, 2012

(54) OBJE NETWORK DEVICE SERVICE CONTROL METHOD AND SYSTEM

(75) Inventors: Jun-hyeong Kim, Anyang-si (KR); Sang Do Park, Seoul (KR); Russell Roger Atkinson, Aptos, CA (US)

(73) Assignee: Samsung Electronics, Ltd., Suwon-si (KR)

( * ) Notice: Subject to any disclaimer, the term of this patent is extended or adjusted under 35 U.S.C. 154(b) by 594 days.

(21) Appl. No.: 11/773,219

(22) Filed: Jul. 3, 2007

(65) Prior Publication Data

US 2009/0013077 A1   Jan. 8, 2009

(51) Int. Cl.
*G06F 15/16* (2006.01)
(52) U.S. Cl. .......................................... 709/219; 726/12
(58) Field of Classification Search .................. 370/401; 709/245, 219; 726/12
See application file for complete search history.

(56) References Cited

U.S. PATENT DOCUMENTS

| | | | |
|---|---|---|---|
| 6,571,277 B1 * | 5/2003 | Daniels-Barnes et al. .... | 709/213 |
| 6,665,705 B1 * | 12/2003 | Daniels-Barnes et al. .... | 709/203 |
| 6,725,281 B1 * | 4/2004 | Zintel et al. .................... | 719/318 |
| 6,779,004 B1 * | 8/2004 | Zintel ............................ | 709/227 |
| 6,892,230 B1 * | 5/2005 | Gu et al. ........................ | 709/220 |
| 7,130,925 B2 * | 10/2006 | Noda et al. .................... | 709/249 |
| 7,136,709 B2 * | 11/2006 | Arling et al. .................... | 700/65 |
| 7,155,305 B2 * | 12/2006 | Hayes et al. ................... | 700/224 |
| 7,325,057 B2 * | 1/2008 | Cho et al. ....................... | 709/224 |
| 7,376,723 B2 * | 5/2008 | Cho et al. ....................... | 709/223 |
| 7,412,538 B1 * | 8/2008 | Eytchison et al. ............. | 709/245 |
| 7,548,960 B2 * | 6/2009 | Kang et al. .................... | 709/218 |
| 2002/0078161 A1 | 6/2002 | Cheng | |
| 2003/0110298 A1 | 6/2003 | Lanigan | |
| 2003/0110334 A1 | 6/2003 | Lanigan et al. | |
| 2003/0217136 A1 * | 11/2003 | Cho et al. ....................... | 709/223 |
| 2005/0021852 A1 * | 1/2005 | Accarie et al. ................ | 709/245 |
| 2005/0078679 A1 * | 4/2005 | Henry et al. ................ | 370/395.2 |
| 2005/0108331 A1 * | 5/2005 | Osterman ...................... | 709/205 |
| 2005/0160172 A1 * | 7/2005 | Eytchison ..................... | 709/227 |
| 2005/0210155 A1 * | 9/2005 | Oeda et al. ..................... | 709/249 |
| 2005/0272469 A1 * | 12/2005 | Lee et al. ....................... | 455/557 |

(Continued)

FOREIGN PATENT DOCUMENTS

JP           2003345683 A      12/2003

(Continued)

OTHER PUBLICATIONS

W. Keith Edwards, MArk W. Newman, Trevor F. SMith, Jana Sedivy, Shahram Izadi : An Extensible Set-Top Box Platform for Home Media Applications, : vol. 51, No. 4 ,Nov. 2005.*

(Continued)

*Primary Examiner* — Krisna Lim
*Assistant Examiner* — Margishi Desai
(74) *Attorney, Agent, or Firm* — Sughrue Mion, PLLC

(57) ABSTRACT

An Obje network device service control method and system, the method including: discovering Obje components by an Obje proxy, and generating component proxies by an Obje proxy, the component proxies respectively corresponding to the Obje components; discovering the component proxies by a Universal Plug and Play (UPnP) control point, and requesting by the UPnP control point a component proxy of the component proxies, which is selected by a UPnP control point, for a presentation page; generating and providing by the selected component proxy the presentation page to the UPnP control point; and controlling by the UPnP control point a transfer session between the Obje components based on the presentation page.

22 Claims, 7 Drawing Sheets

U.S. PATENT DOCUMENTS

| | | | |
|---|---|---|---|
| 2006/0075100 A1* | 4/2006 | Stirbu | 709/225 |
| 2006/0101109 A1* | 5/2006 | Nishio | 709/200 |
| 2006/0129700 A1* | 6/2006 | Bopardikar | 710/2 |
| 2006/0153072 A1* | 7/2006 | Bushmitch et al. | 370/230 |
| 2006/0184660 A1* | 8/2006 | Rao et al. | 709/224 |
| 2006/0230130 A1* | 10/2006 | Cho et al. | 709/223 |
| 2006/0279774 A1* | 12/2006 | Matsuoka et al. | 358/1.15 |
| 2006/0288071 A1* | 12/2006 | Bigioi et al. | 709/203 |
| 2007/0005746 A1* | 1/2007 | Roe et al. | 709/223 |
| 2007/0115996 A1* | 5/2007 | Shitano et al. | 370/392 |
| 2007/0162583 A1* | 7/2007 | Takahashi et al. | 709/223 |
| 2007/0162586 A1* | 7/2007 | Kim | 709/223 |
| 2007/0211632 A1* | 9/2007 | Song et al. | 370/230 |
| 2007/0286100 A1* | 12/2007 | Saaranen et al. | 370/260 |
| 2008/0010374 A1* | 1/2008 | Lim et al. | 709/225 |
| 2008/0033962 A1* | 2/2008 | Yamamoto et al. | 707/10 |
| 2008/0103608 A1* | 5/2008 | Gough et al. | 700/1 |
| 2008/0112419 A1* | 5/2008 | Lee et al. | 370/401 |
| 2008/0205419 A1* | 8/2008 | Shin et al. | 370/401 |

FOREIGN PATENT DOCUMENTS

| | | |
|---|---|---|
| KR | 1020030004540 A | 1/2003 |
| KR | 1020030070300 A | 8/2003 |
| KR | 1020030071290 A | 9/2003 |
| KR | 1020040045185 A | 6/2004 |
| KR | 1020060023176 A | 3/2006 |

OTHER PUBLICATIONS

Pascal et. al, :Software Engineering of Pervasive Servicec.*
Edwards et.al : An Extensible Set-Top Box Platform for Home Media Applications.*

* cited by examiner

OBJE NETWORK DEVICE SERVICE CONTROL METHOD AND SYSTEM

BACKGROUND OF THE INVENTION

1. Field of the Invention

Methods and apparatuses consistent with the present invention relate to an Obje network device service, and more particularly, to an Obje network device service control method and system where a Universal Plug and Play (UPnP) control point of an UPnP network may control an Obje network device.

2. Description of Related Art

With the popularization of high-speed Internet and digital home appliances, a home network, a primary form of a ubiquitous network, has been appearing.

Middleware, such as a UPnP and Obje, is used to discover (e.g. detect) and control devices in a home network and provide home network services.

Obje guarantees the interoperability among devices in an ad-hoc environment. Generally, a prearranged agreement regarding performance and interface of a device is required in order to guarantee the interoperability among devices. Obje reduces the prearranged agreement requirement regarding the interface, and thereby may enable the interoperability among devices. Also, Obje uses mobile codes, and thereby may alleviate deficiencies and improve performance of the devices. The mobile code includes a network protocol handler, a content handler, and a user interface.

A unit module providing services in an Obje network is called an Obje component. The Obje network comprises an Obje source component, an Obje sink component, and an Obje client. The Obje source component provides the Obje sink component with data streams, and the mobile codes, which is necessary for managing the data streams. The Obje client discovers Obje components, and generates a session for data transmission between the Obje components. The Obje sink component includes a mobile code execution platform which is operated by loading the mobile codes provided by the Obje source component. Such Obje middleware may alleviate deficiencies and improve performance of the Obje component by using the mobile codes. Accordingly, the interoperability among devices may be guaranteed by only a minimal prearranged agreement.

UPnP is a type of middleware for controlling personal computer (PC)-oriented home appliances. In this instance, the PC refers to the PC generally developed by Microsoft Corporation, Intel Corporation, and the like. UPnP is based on a standard Internet protocol such as Transmission Control Protocol/Internet Protocol (TCP/IP), HyperText Transfer Protocol (HTTP), General Event Notification Architecture (GENA), Simple Object Access Protocol (SOAP), Simple Service Discovery Protocol (SSDP), eXtensible Markup Language (XML), and the like. Also, UPnP does not require device drivers and a use of a particular application program interface (API), and is unaffected by various types of physical network layers, operation systems, and programming languages.

A UPnP network comprises an UPnP device and an UPnP control point. The UPnP device provides services, and responds to a request of the UPnP control point. The UPnP control point discovers the UPnP device and requests the services.

In the UPnP middleware, a profile is required to be defined for each device, and devices which use a different profile may not receive and transmit messages or contents with each other. The UPnP control point obtains a description from an UPnP device, and controls a corresponding device by using information included in the description.

Conversely, in the Obje middleware, only minimal interfaces which satisfy every type of device are defined, instead of defining profiles for each device. Also, in the Obje middleware, when having a same data type, a sink component and a source component may receive and transmit contents, regardless of device type.

Thus, an Obje network device service control method and system, which may control Obje devices by using an UPnP control point in the home network environment including UPnP devices as well as Obje devices, is required.

SUMMARY OF THE INVENTION

The present invention provides an Obje network device service control method and system where a UPnP control point of an UPnP network may control an Obje device.

The present invention also provides an Obje network device service control method and system where an UPnP control point controls a transfer session between Obje devices.

The present invention also provides an Obje network device service control method and system which use an Obje device in an UPnP network system.

According to an aspect of the present invention, an Obje network device service control method, the method including: discovering Obje components by an Obje proxy, and generating component proxies by the Obje proxy, the component proxies respectively corresponding to the Obje components; discovering the component proxies by a UPnP control point, and requesting by the UPnP control point a component proxy of the component proxies, which is selected by a UPnP control point from the component proxies, for a presentation page; generating and providing by the selected component proxy the presentation page to the UPnP control point; and controlling by the UPnP control point a transfer session between the Obje components based on the presentation page.

The Obje network device service control method may further include requesting by the selected component proxy any one of the Obje components, which are connected to the transfer session, for a session controller, if the transfer session between the Obje components is connected; receiving by the selected component proxy the session controller from the requested Obje component; and providing by the selected component proxy a second presentation page to the UPnP control point by using the session controller.

The session controller may comprise a user interface, which is loaded and used by the UPnP control point, and a message relay which relays a message between the UPnP control point and an Obje component of the Obje components.

The user interface may be an applet-based user interface to be included in the other presentation page.

The presentation page may comprise connection buttons used for a connection of the transfer session between the Obje components.

The other presentation page may comprise a disconnection button used for a disconnection of the connected transfer session between the Obje components.

The component proxies are provided with an Obje network status information object from the Obje proxy, and the selected component proxy provides the presentation page to the UPnP control point by referring to the Obje network status information object.

According to another aspect of the present invention, an Obje network device service control system is provided, the system including: an Obje proxy which discovers Obje components, and generates component proxies respectively corresponding to the Obje components; and an UPnP control point which discovers the component proxies, and controls a transfer session between the Obje components based on a presentation page which is provided by a component proxy selected from the component proxies.

The UPnP control point is provided with another presentation page from the selected component proxy, when the transfer session between the Obje components is connected.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Figure 1:
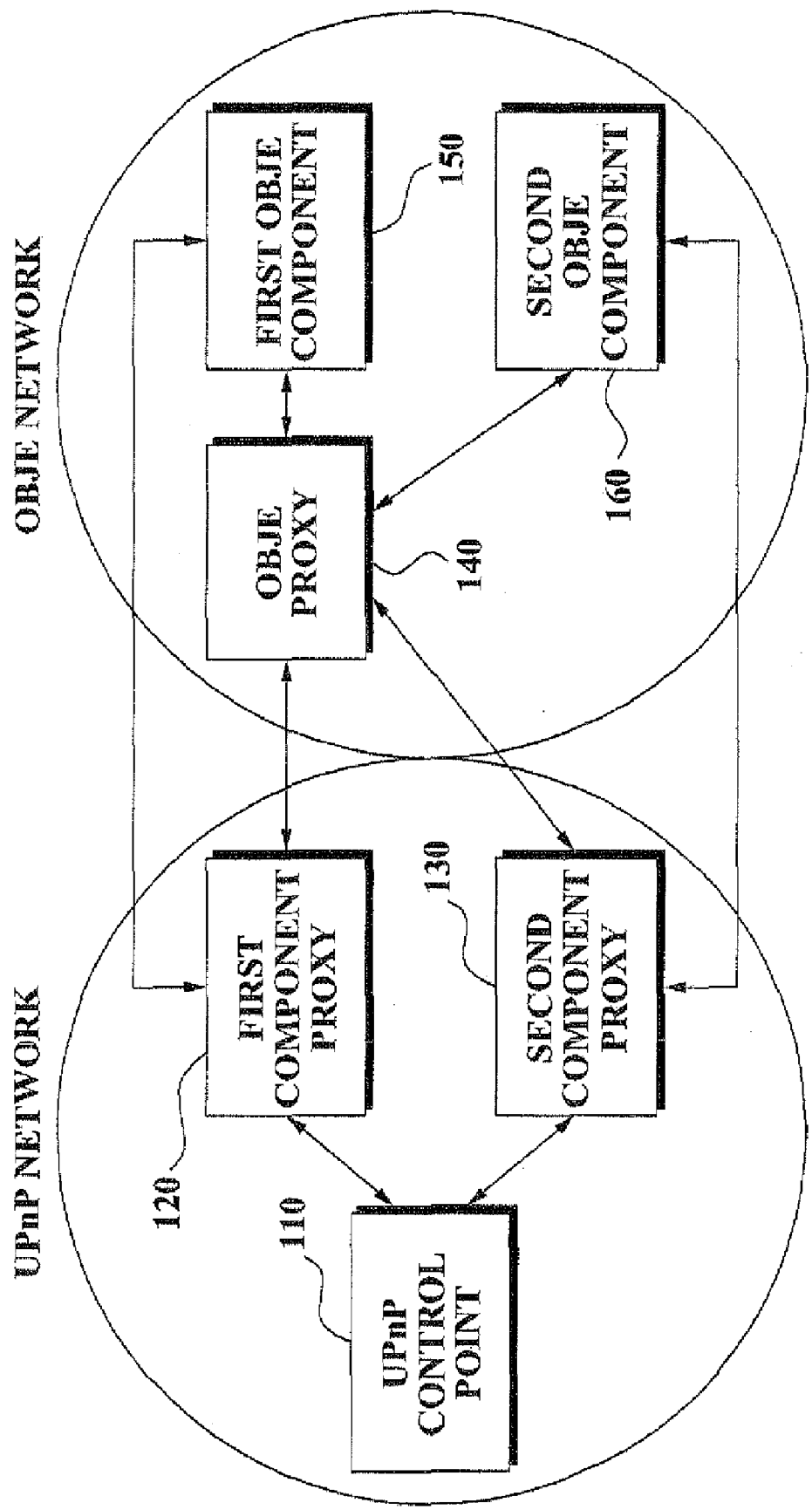
FIG. 1 is a diagram illustrating a system for providing an Obje network device service in a UPnP network system according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a diagram illustrating a system for providing an Obje network device service in a UPnP network system according to an exemplary embodiment of the present invention.

Referring to FIG. 1, the system for providing an Obje network device service in an UPnP network includes an UPnP control point 110, a first component proxy 120, a second component proxy 130, a first Obje component 150, a second Obje component 160, and an Obje proxy 140.

It is assumed that the first Obje component 150 and the second Obje component 160 are different, although the first Obje component 150 and the second Obje component 160 have a same data type. For example, the first Obje component 150 may be an Obje source component and the second Obje component 160 may be an Obje sink component.

The Obje proxy 140 discovers Obje components included in an Obje network, and generates component proxies corresponding to the Obje components.

Specifically, the Obje proxy 140 discovers the first Obje component 150 and the second Obje component 160, and generates the first component proxy 120 and the second component proxy 130 corresponding to each of the first Obje component 150 and the second Obje component 160.

In this case, the first component proxy 120 and the second component proxy 130 may be UPnP devices representing the first Obje component 150 and the second Obje component 160.

In this case, the Obje proxy 140 may discover the first Obje component 150 and the second Obje component 160 by using an Obje discovery.

The Obje proxy 140 generates the first component proxy 120 and the second component proxy 130 in the UPnP network.

The UPnP control point 110 discovers the component proxies generated by the Obje proxy 140, and controls a transfer session between the Obje components based on a presentation page which is received from any one of the component proxies.

Specifically, the UPnP control point 110 controls the transfer session between the first Obje component 150 and the second Obje component 160 by using the presentation page which is received from any one of the first component proxy 120 and the second component proxy 130.

In this case, the UPnP control point 110 selects any one of the component proxies, and requests the selected component proxy for the presentation page. Accordingly, the UPnP control point 110 may receive the presentation page from the selected component proxy.

In this case, the UPnP control point 110 may control the transfer session between the Obje components using the selected component proxy.

In this case, the presentation page may include connection buttons to be used for a connection of the transfer session between the Obje components.

Any one of the first component proxy 120 and the second component proxy 130 provides the presentation page according to the request of the UPnP control point 110, and in the current example, the second component proxy 130 provides the presentation page. The first component proxy 120 may also provide the presentation page.

When the transfer session between the first Obje component 150 and the second Obje component 160 is connected by the control of the UPnP control point 110, the second component proxy 130 receives information from any one of the first Obje component 150 and the second Obje component 160, and in the current example, the second component proxy 130 receives information from the first Obje component 150. The information includes information where a session controller is added. The information may also be received from the second Obje component 160.

In this case, the second component proxy 130 may receive the added session controller by requesting the first Obje component 150 for the added session controller.

In this case, the second component proxy 130 generates another presentation page by using the session controller and may provide the generated presentation page to the UPnP control point 110.

In this case, the session controller may include a user interface and a message relay. The user interface may be loaded and used by the UPnP control point 110, and the message relay relays a message between the UPnP control point 110 and the Obje component.

In this case, the user interface is an applet-based user interface to be included in the other presentation page.

In this case, the other presentation page includes a disconnection button used for a disconnection of the connected transfer session between the Obje components.

Figure 2:
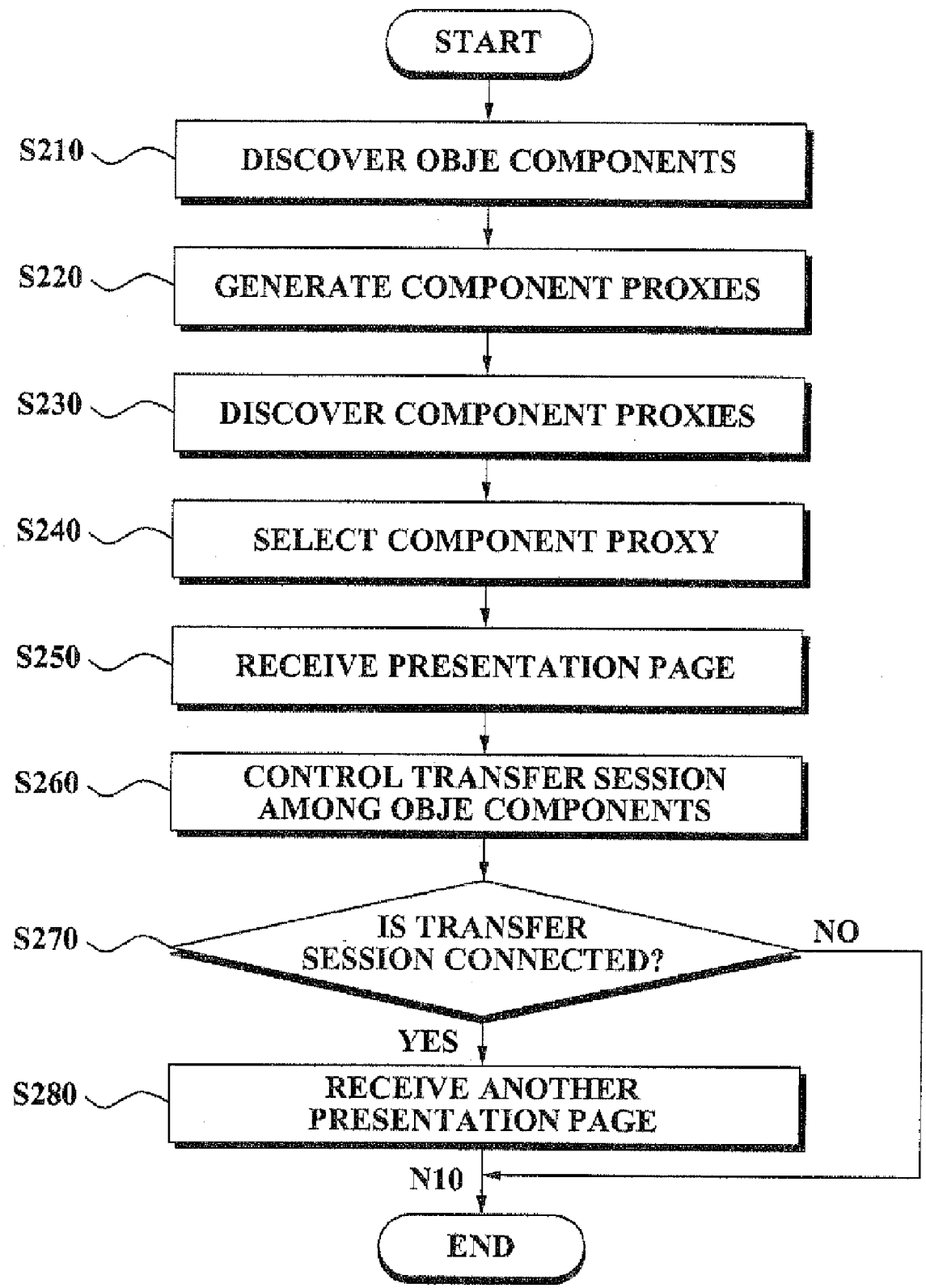
FIG. 2 is a flowchart illustrating an Obje network device service control method according to an exemplary embodiment of the present invention.

FIG. 2 is a flowchart illustrating an Obje network device service control method according to an exemplary embodiment of the present invention.

Referring to FIG. 2, in operation S210, in the Obje network device service control method, an Obje proxy discovers Obje components, included in an Obje network, by using an Obje discovery.

In operation S220, the Obje proxy generates component proxies corresponding to each of the Obje components.

In this case, the component proxies may be UPnP devices representing the Obje components.

In operation S230, an UPnP control point discovers the component proxies generated in an UPnP network by using an UPnP discovery.

In operation S240, the UPnP control point selects any one of the component proxies.

In operation S250, the UPnP control point requests the selected component proxy for a presentation page, and receives the requested presentation page from the selected component proxy. The presentation page may control a transfer session between the Obje components.

In this case, the presentation page may vary depending on the connected transfer session between the Obje components in an Obje network.

In this case, the presentation page may include connection buttons used for a connection of the transfer session between the Obje components. Specifically, the presentation page may include the connection buttons with respect to a connection of a transfer session between each counter Obje component and the Obje component corresponding to the selected component proxy. In this instance, each of the counter Obje components has a same type as the Obje component.

For example, when the Obje component corresponding to the selected component proxy is an Obje sink component, the presentation page includes connection buttons which may make a connection for a transfer session between each Obje source component and the Obje sink component. Each of Obje source components has a same data type as the Obje sink component.

In operation S260, the UPnP control point controls the transfer session between the Obje components by using the presentation page received from the selected component proxy.

Specifically, the UPnP control point connects the transfer session between the Obje components by using the connection buttons of the presentation page.

In this case, the UPnP control point may control the transfer session between the Obje components using the selected component proxy.

In operation S270, the selected component proxy senses whether the transfer session between the Obje components is connected.

In this case, the selected component proxy may ascertain whether the transfer session is connected.

As a result of the determination in operation S270, when the transfer session between the Obje components is connected, the selected component proxy generates another presentation page and provides the other presentation page to the UPnP control point.

In operation S280, the UPnP control point receives the other presentation page and controls the transfer session between the Obje components by using the other presentation page.

In this case, the other presentation page may include a disconnection button used for a disconnection of the transfer session between the Obje components.

In this case, the other presentation page may include a user interface which may control the transfer session or acquire status information of the transfer session.

The Obje proxy and the component proxy share exact current status information of the Obje network. Specifically, the component proxy generates the presentation page by referring to the status information or determines whether a command from the UPnP control point is appropriate when receiving the command, in order to overcome disadvantages which may be generated when the UPnP control point controls the transfer session between the Obje components.

As an example, when the presentation page reflects a status of only when the component proxy provides the presentation page to the UPnP control point, even when another Obje component is added or another transfer session is connected after the UPnP control point receives the presentation page, the presentation page does not automatically include information of where the other Obje component is added or the other transfer session is connected.

Accordingly, when a user pushes the connection button or the disconnection button of the presentation page, a component proxy receiving the command may repeatedly generate a previously generated transfer session or disconnect a non-existent transfer session, since the component proxy may not know an exact current status of the Obje network.

Thus, the Obje proxy and the component proxy according to an exemplary embodiment of the present invention share the exact current status information of the Obje network, and thereby may overcome the above-described disadvantage.

The status information of the Obje network is managed by the Obje proxy in an object form. The Obje proxy provides reference information with respect to a status information object so that the component proxy may share the status information object of the Obje network, that is, an Obje network status information object, when generating the component proxy.

In this case, the component proxy may refer to the Obje network status information object when generating the presentation page.

In this case, the component proxy determines whether the command is appropriate by referring to the Obje network status information object when receiving the command from the UPnP control point, and may execute the command only when the command is feasible.

In this case, the Obje network status information object may be revised so that the Obje network status information object may reflect a current Obje network status after the component proxy executes the command.

The Obje network status information object includes a list of Obje components, a list of component proxies, a list of newly added Obje components, a list of objects representing a pair of components comprising an Obje source component and an Obje sink component having a same data type, and a list of objects which are connected to the transfer session from the objects representing the pair of components.

In this case, the objects representing the pair of components comprising the Obje source component and the Obje sink component may include a list of the Obje source component, the Obje sink component, a data type, information about whether the transfer session is connected, and a session controller.

Figure 3:
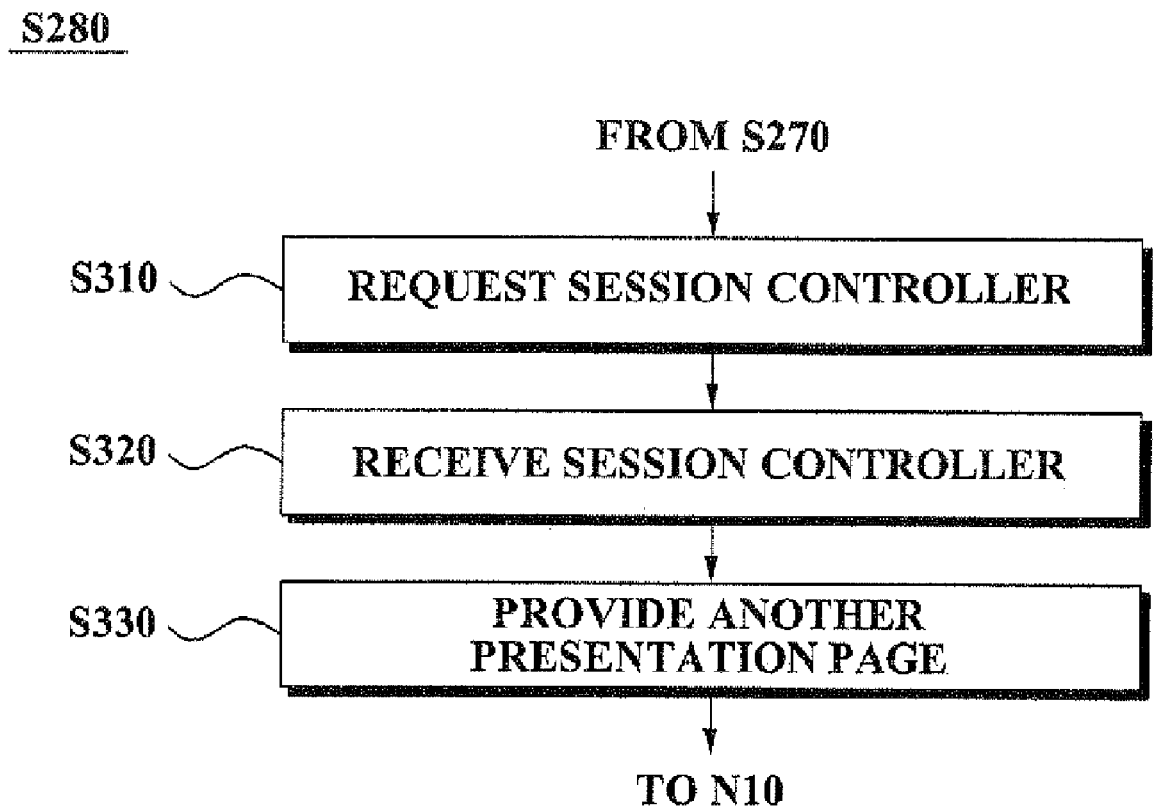
FIG. 3 is a flowchart illustrating operation S280 of FIG. 2 in detail.

FIG. 3 is a flowchart illustrating operation S280 of FIG. 2 in detail.

Referring to FIG. 3, when the UPnP control point receives the other presentation page in operation S280, and the transfer session between the Obje components is connected, any one of Obje components where the transfer session is connected adds the session controller to the transfer session and transmits information about the adding to the component proxy.

Here, it is assumed that an Obje component which adds the session controller is a first Obje component.

In operation S310, the component proxy requests the first Obje component for the added session controller.

In operation S320, the component proxy receives the added session controller from the first Obje component.

In operation S330, the component proxy generates the other presentation page by using the session controller and provides the other presentation page to the UPnP control point.

Here, the session controller is used for controlling the transfer session or acquiring status information of the transfer session, and provided in a mobile code form.

The session controller includes a session controller which may be used by the UPnP control point.

In this case, the session controller which may be used by the UPnP control point may include an Obje middleware-independent part and an Obje middleware-dependent part. In this case, the Obje middleware-independent part may be loaded and used by the UPnP control point. The Obje middleware-dependent part is preferably located in the component proxy.

In this case, the Obje middleware-independent part may be a user interface which is interoperable with a user, and the Obje middleware-dependent part may be a message relay which relays a message between the UPnP control point and the Obje component.

The component proxy provides the UPnP control point with the presentation page including the connection buttons and the disconnection buttons. Accordingly, the user interface included in the session controller is preferably an applet-based user interface to be included in the presentation page.

In this case, a proprietary protocol may be used between the applet-based user interface and the message relay, and the Obje middleware may be used between the message relay and the Obje component.

The Obje network device service control method is described in detail with reference to FIGS. 4 through 7.

Figure 4:
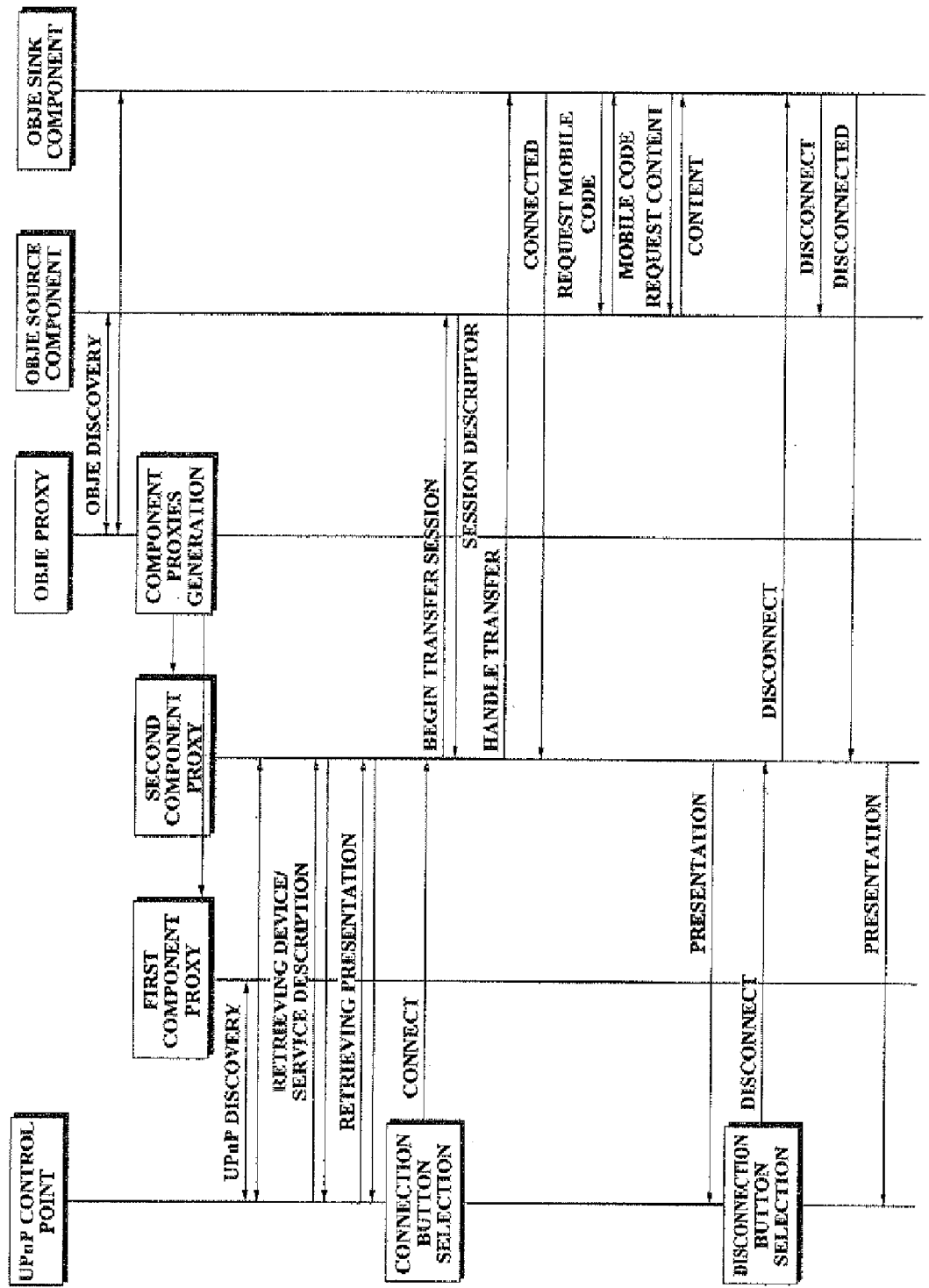
FIG. 4 is a flowchart illustrating an operation of controlling a transfer session between Obje components by using a presentation page according to an exemplary embodiment of the present invention.

FIG. 4 is a flowchart illustrating an operation of controlling a transfer session between Obje components by using a presentation page according to an exemplary embodiment of the present invention.

Referring to FIG. 4, an Obje proxy discovers an Obje source component and an Obje sink component by using an Obje discovery in an Obje network.

The Obje proxy generates a first component proxy and a second component proxy corresponding to the Obje source component and the Obje sink component, respectively in an UPnP network.

An UPnP control point discovers the first component proxy and the second component proxy by using an UPnP discovery in the UPnP network. When the UPnP control point requests the second component proxy for UPnP description information, the second component proxy provides the UPnP control point with the UPnP description information. The UPnP control point may also select the first component proxy.

When the UPnP control point requests the second component proxy for a presentation page by using the UPnP description information of the second component proxy, the second component proxy provides the UPnP control point with the presentation page.

The UPnP control point displays the presentation page to a user by operating a program such as a web browser.

In this case, the presentation page may include connection buttons.

In this case, the connection buttons represent a pair of components including the Obje source component and the Obje sink component. The Obje source component and the Obje sink component have a same data type, and a transfer session between the Obje source component and the Obje sink component may be connected.

The user selects a desirable connection button in the presentation page. When the user pushes the desirable connection button, a message is transmitted to the second component proxy. The message requests that the transfer session between the Obje source component and the Obje sink component is connected.

The second component proxy receives the message and connects the transfer session between the Obje source component and the Obje sink component. When the transfer session between the Obje source component and the Obje sink component is connected, the Obje sink component reports to the second component proxy that the transfer session is connected, and requests the Obje source component for a mobile code. Also, the Obje source component transmits the mobile code to the Obje sink component.

Here, the mobile code is a program for receiving and controlling contents provided by the Obje source component to the Obje sink component. The mobile code includes a protocol handler, a content handler, and the like. The protocol handler is required for the Obje sink component to receive the contents, and the content handler is required to control the contents received in the Obje sink component.

When receiving the mobile code from the Obje source component, the Obje sink component requests the Obje source component for a transmission of the contents after loading and operating the mobile code. The Obje source component provides the requested contents to the Obje sink component.

When receiving a message from the Obje sink component, the second component proxy generates another presentation page in response to the request for the connection of the transfer session, and transmits the other presentation page to the UPnP control point. The message reports that the transfer session is connected.

In this case, the other presentation page may include connection buttons and disconnection buttons corresponding to the connected transfer session.

When the user selects a desirable disconnection button in the other presentation page, a message requesting a disconnection of the transfer session is transmitted to the second component proxy. The second component proxy receives the message and requests the Obje sink component for the disconnection of the connected transfer session.

After disconnecting the transfer session, the Obje sink component reports to the second component proxy that the transfer session is disconnected. When reported, the second component proxy generates the other presentation page, in response to the request for the disconnection of the transfer session from the UPnP control point, and provides the other presentation page to the UPnP control point.

In this case, the other presentation page may not further include the disconnection button corresponding to the transfer session.

Figure 5:
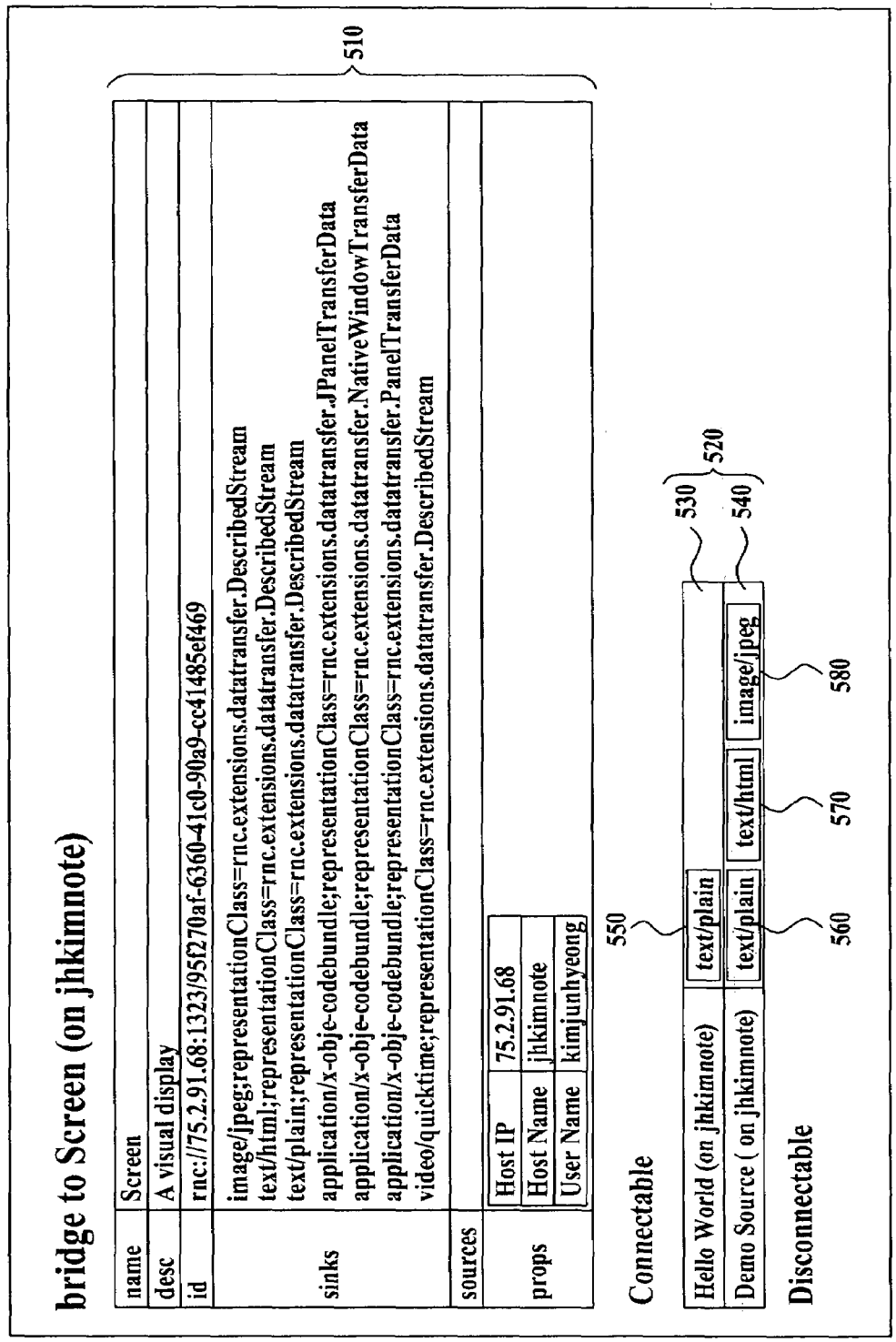
FIG. 5 is a diagram illustrating an example of a presentation page according to an exemplary embodiment of the present invention.

FIG. 5 is a diagram illustrating an example of a presentation page according to an exemplary embodiment of the present invention.

Referring to FIG. 5, the presentation page includes an Obje component information display portion 510, a connection button display portion 520, and a disconnection button display portion. Here, the disconnection button display portion is disabled since a connected transfer session does not exist.

The Obje component information display portion 510 is a portion displaying information of an Obje component which is represented by a component proxy.

The connection button display portion 520 includes a plurality of connection buttons 550, 560, 570, and 580 with respect to a plurality of Obje components 530 and 540. Each of the plurality of the connection buttons 550, 560, 570, and 580 represent a pair of components including an Obje source component and an Obje sink component. The Obje source component and the Obje sink component have a same data type. Any one of the Obje source component and the Obje sink component may be the Obje component which is represented by the component proxy.

When a user pushes a connection button, for example, "Hello World", the connection button 550 of the Obje component 530, a transfer session between Obje components, represented by the pushed connection button, is connected.

When the transfer session is connected, the component proxy generates another presentation page and provides the other presentation page to an UPnP control point.

In this case, the other presentation page may include a disconnection button and an applet-based user interface. The disconnection button may disconnect a connection of the transfer session, and the applet-based user interface may control the transfer session.

Figure 6:
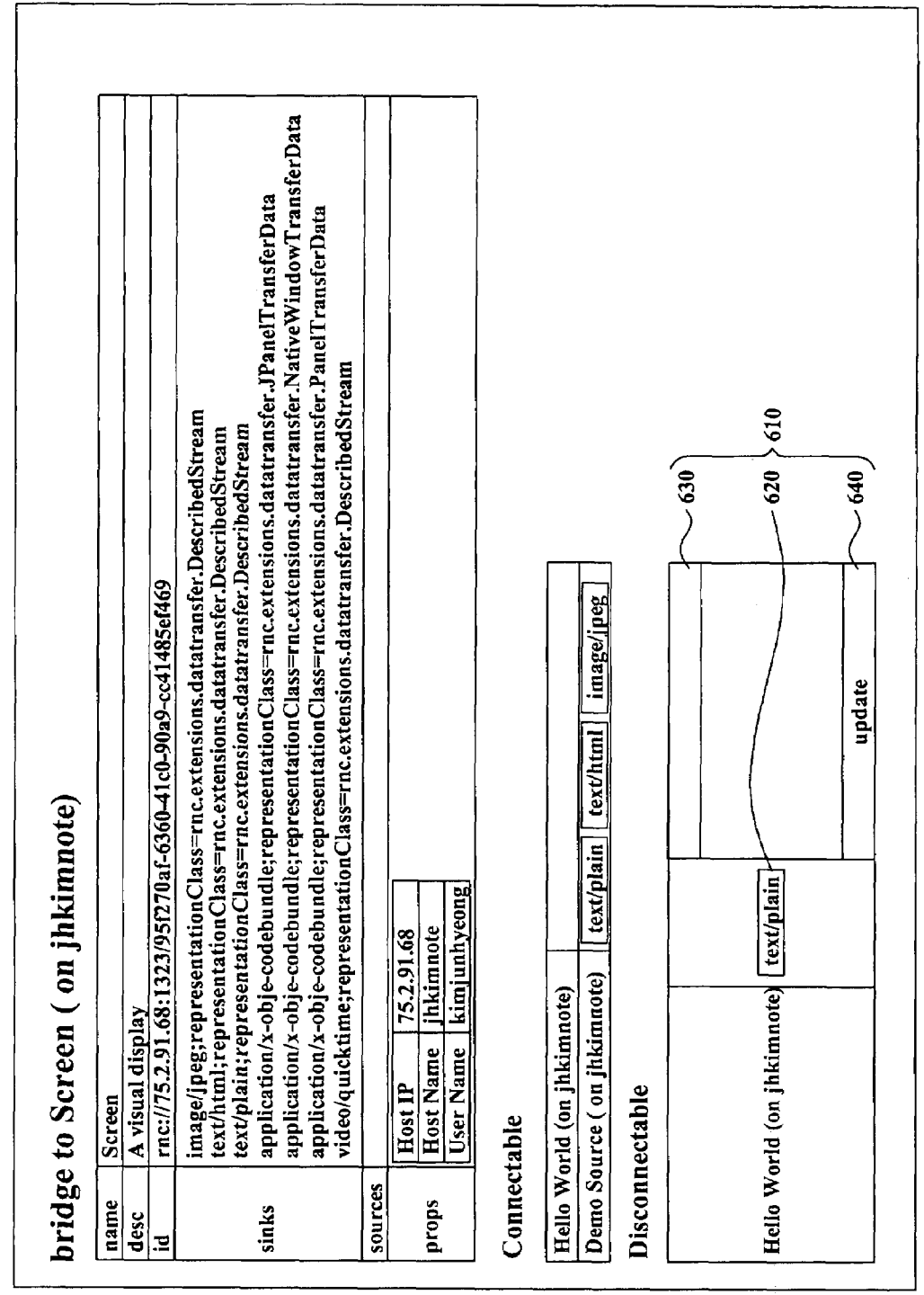
FIG. 6 is a diagram illustrating an example of another presentation page according to an exemplary embodiment of the present invention.

FIG. 6 is a diagram illustrating an example of another presentation page according to an exemplary embodiment of the present invention.

Here, FIG. 6 illustrates another presentation page provided from a component proxy when a transfer session between Obje components is connected. The Obje components are represented by the connection button 550, illustrated in FIG. 5, when the connection button is selected.

Referring to FIG. 6, in the other presentation page, the transfer session is connected. Accordingly, the selected connection button is disabled to prevent a same transfer session from being repeatedly generated.

Conversely, a disconnection button display portion 610 includes a disconnection button 620 and user interfaces 630 and 640. The disconnection button 620 may disconnect a connected transfer session, and the user interfaces 630 and 640 may control the transfer session or acquire status information of the transfer session.

In this case, the disconnection button display portion 610 may not include the user interfaces 630 and 640.

When a user selects the disconnection button 620, the component proxy disconnects a connection of the transfer session, represented by the disconnection button 620, generates the other presentation page and provides the other presentation page to an UPnP control point.

In this case, the other presentation page does not include the disconnection button 620 and the user interface 630 and 640, and the disabled connection button is activated to be able to connect another transfer session.

Figure 7:
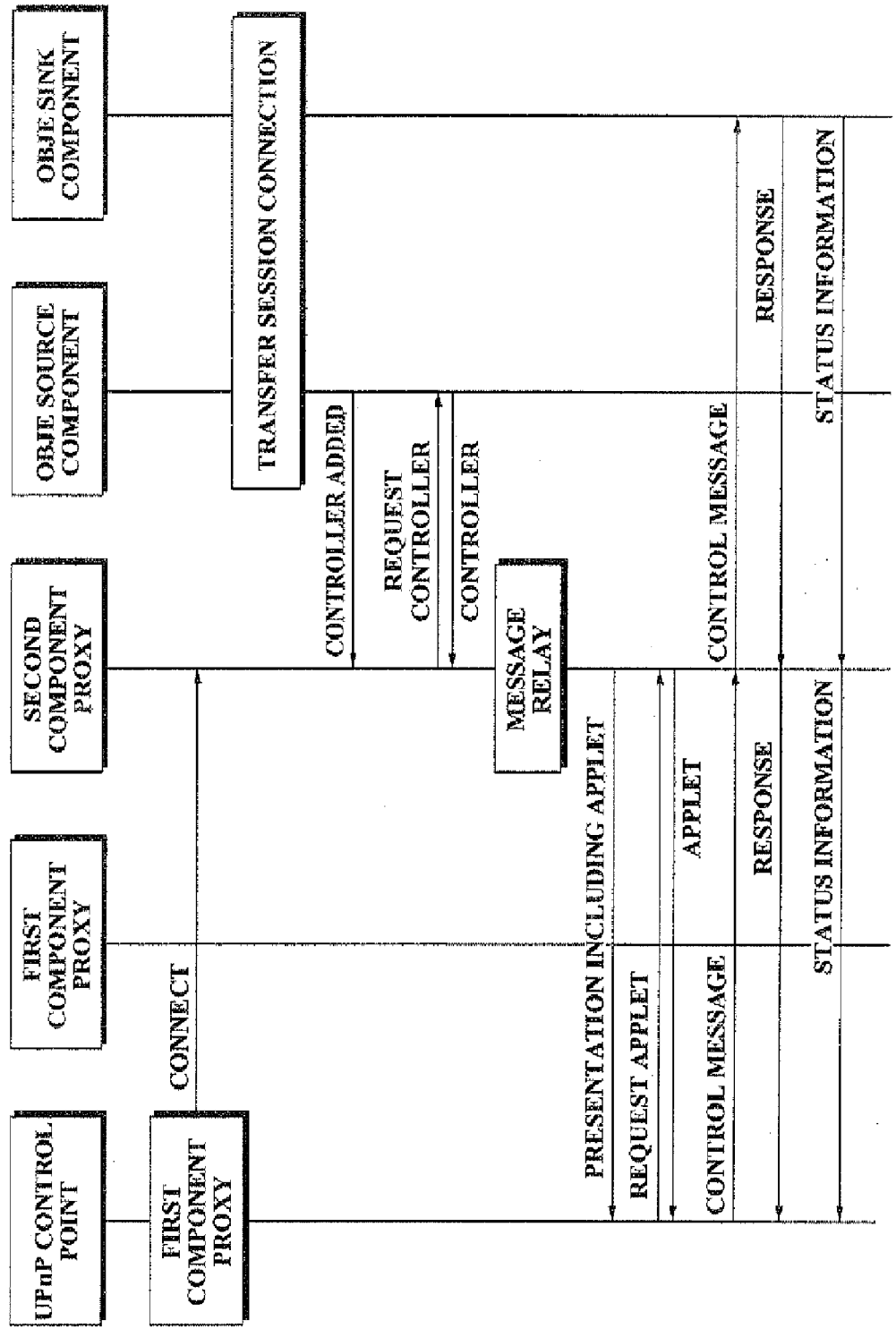
FIG. 7 is a flowchart illustrating an operation of generating a presentation page by using a session controller and controlling a transfer session between Obje components according to an exemplary embodiment of the present invention.

FIG. 7 is a flowchart illustrating an operation of generating a presentation page by using a session controller and controlling a transfer session between Obje components according to an exemplary embodiment of the present invention.

Referring to FIG. 7, when a user selects a connection button of a presentation page, and a transfer session between an Obje source component and an Obje sink component is connected, the Obje source component adds a session controller to the transfer session and transmits information about the adding to a second component proxy.

In this case, the Obje sink component may also add the session controller to the transfer session.

When sensing that the session controller is added to the transfer session, the second component proxy requests the Obje source component for the session controller.

The Obje source component provides the session controller in a mobile code form to the second component proxy in response to the request for the session controller.

Here, the session controller includes a user interface and a message relay. The user interface is an applet-based user interface which is independent of an Obje middleware, and the message relay is dependent to the Obje middleware.

The second component proxy generates the presentation page including the applet-based user interface after loading and operating the message relay, and provides the presentation page to an UPnP control point.

The UPnP control point receives and displays the presentation page to a user by operating a program such as a web browser. The user transmits a command to control the transfer session to the Obje source component by using the applet-based user interface included in the presentation page, or acquires status information of the transfer session from the Obje source component.

In this case, the message relay relays a message transceiving between the applet-based user interface and the Obje source component.

The Obje network device service control method according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the exemplary embodiments of the present invention, there is provided an Obje network device service control method and system where an UPnP control point of an UPnP network may control an Obje device.

Also, according to the exemplary embodiments of the present invention, there is provided an Obje network device service control method and system where an UPnP control point controls a transfer session between Obje devices.

Also, according to the present invention, there is provided an Obje network device service control method and system which use an Obje device in an UPnP network system.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An Obje network device service control method of a Universal Plug and Play (UPnP) control point located in a UPnP network, the method comprising:
   discovering Obje components by an Obje proxy, wherein the Obje components and the Obje proxy are located in an Obje network;
   generating component proxies in the UPnP network by the Obje proxy, the component proxies respectively corresponding to the Obje components;
   discovering the component proxies by the UPnP control point, and requesting by the UPnP control point a component proxy of the component proxies, which is selected by the UPnP control point, for a presentation page;
   generating and providing by the selected component proxy the presentation page to the UPnP control point; and
   controlling by the UPnP control point a transfer session between the Obje components based on the presentation page.

2. The method of claim 1, further comprising:
   requesting by the selected component proxy one of the Obje components, which are connected to the transfer session, for a session controller, if the transfer session between the Obje components is connected;
   receiving by the selected component proxy the session controller from the requested Obje component; and
   providing by the selected component proxy a second presentation page to the UPnP control point by using the session controller.

3. The method of claim 2, wherein the session controller comprises a user interface, which is loaded and used by the UPnP control point, and a message relay which relays a message between the UPnP control point and an Obje component of the Obje components.

4. The method of claim 3, wherein the user interface is an applet-based user interface to be included in the second presentation page.

5. The method of claim 1, wherein the presentation page comprises connection buttons used for a connection of the transfer session between the Obje components.

6. The method of claim 1, further comprising:
   providing a third presentation page to the UPnP control point by the selected component proxy, if the transfer session between the Obje components is connected.

7. The method of claim 6, wherein the third presentation page comprises a disconnection button used for a disconnection of the connected transfer session between the Obje components.

8. The method of claim 1, wherein the controlling by the UPnP control point controls the transfer session between the Obje components via the selected component proxy.

9. The method of claim 1, wherein the component proxies are UPnP devices representing the Obje components.

10. The method of claim 1, wherein the component proxies are provided with an Obje network status information object from the Obje proxy.

11. The method of claim 10, wherein the selected component proxy provides the presentation page to the UPnP control point by referring to the Obje network status information object.

12. The method of claim 10, wherein the selected component proxy determines an appropriateness of a command by referring to the Obje network status information object, if the command is received from the UPnP control point.

13. The method of claim 10, wherein the Obje network status information object comprises a Obje components list, a component proxies list, a newly added Obje components list, a list of objects representing a pair of components comprising an Obje source component and an Obje sink component having a same data type, and a list of connected objects from the objects representing the pair of components, the connected objected being connected to the transfer session.

14. A non-transitory computer-readable recording medium storing a program for implementing an Obje network device service control method of a Universal Plug and Play (UPnP) control point located in a UPnP network, the method comprising:
   discovering Obje components by an Obje proxy, wherein the Obje components and the Obje proxy are located in an Obje network;
   generating component proxies in the UPnP network by the Obje proxy, the component proxies respectively corresponding to the Obje components;
   discovering the component proxies by the UPnP control point, and requesting by the UPnP control point a component proxy of the component proxies, which is selected by the UPnP control point, for a presentation page;
   generating and providing by the selected component proxy the presentation page to the UPnP control point; and
   controlling by the UPnP control point a transfer session between the Obje components based on the presentation page.

15. An Obje network device service control system in an Obje and a UPnP network, the system comprising:
   a processor comprising:
   an Obje proxy which discovers Obje components, wherein the Obje proxy and the Obje components are located in the Obje network, and generates component proxies in the UPnP network respectively corresponding to the Obje components; and
   a Universal Plug and Play (UPnP) control point which is located in the UPnP network and discovers the component proxies, and controls a transfer session between the Obje components based on a presentation page which is provided by a component proxy selected from the component proxies.

16. The system of claim 15, wherein the selected component proxy requests one of the Obje components, which are connected to the transfer session, for a session controller if the transfer session between the Obje components is connected, receives the requested session controller from the requested Obje component, and provides a second presentation page to the UPnP control point by using the session controller.

17. The system of claim 16, wherein the session controller comprises a user interface, which is loaded and used by the UPnP control point, and a message relay which relays a message between the UPnP control point and the Obje components.

18. The system of claim 17, wherein the user interface is an applet-based user interface to be included in the second presentation page.

19. The system of claim 15, wherein the presentation page comprises connection buttons used for a connection of the transfer session between the Obje components.

20. The system of claim 15, wherein the UPnP control point is provided with a third presentation page from the selected component proxy, if the transfer session between the Obje components is connected.

21. The system of claim 20, wherein the third presentation page comprises a disconnection button used for a disconnection of the connected transfer session between the Obje components.

22. The system of claim 15, wherein the UPnP control point controls the transfer session between the Obje components via the selected component proxy.

* * * * *